Patented Mar. 18, 1930

1,750,903

UNITED STATES PATENT OFFICE

MAX PHILLIPS, OF EVANSVILLE, WISCONSIN

RESINOUS CONDENSATION PRODUCT FROM LIGNIN AND FURFURAL

No Drawing.    Application filed April 6, 1929. Serial No. 353,244.

(GRANTED UNDER THE ACT OF MARCH 3, 1883, AS AMENDED APRIL 30, 1928; 370 O. G. 757)

This application is made under the act approved April 30, 1928, and the invention herein described, if patented, may be manufactured and used by or for the Government for governmental purposes without payment to me of any royalty thereon.

I hereby dedicate the invention herein described to the free use of the public, to take effect upon the granting of a patent to me.

It is already known that furfural will condense with phenol or its homologues in the presence of a suitable catalyst to yield resinous condensation products. These resins are used in the arts as substitutes for the resins of the bakelite type. I have found that if lignin is condensed with furfural in the presence of hydrochloric acid as a catalyst, useful resinous condensation products are obtained.

Lignin dissolves readily in furfural. When a furfural solution of lignin is heated to 100° C. and a catalyst such as hydrochloric acid added, the color of the solution changes at once from brown to black and a reaction takes place resulting in the formation of a black resinous condensation product.

Without limiting myself to any particular temperature or concentration of ingredients, nor as to source or particular manner of preparing the lignin, it may be said that the manner in which I proceed in preparing these resins from furfural and lignin is illustrated by the following examples:

*Example No. 1.*—Ten parts of furfural; 10 parts of lignin, and 0.5 part concentrated hydrochloric acid are heated together for 1 hour in an oil bath maintained at 150° C. The product when cooled to 25° C. is a black brittle resin.

*Example No. 2.*—Ten parts of furfural; 20 parts of lignin, and 0.5 part concentrated hydrochloric acid are heated together for 2 hours in an oil bath maintained at 150° C. The product when cooled to 25° C. is a black, hard, brittle resin.

*Example No. 3.*—Ten parts of furfural; 30 parts of lignin, and 0.5 part concentrated hydrochloric acid are heated slowly in an oil bath up to 150° C., and then maintained at this temperature for 1 hour. The product when cooled to 25° C. is a black, very hard brittle resin.

*Example No. 4.*—Thirty parts of furfural; ten parts of lignin, are heated together to 120° C., then 0.5 part concentrated hydrochloric acid is added, after which heating is continued at 150° C. for one half hour. The product when cooled to 25° C. is a black resinous condensation product.

*Example No. 5.*—Thirty parts of lignin; 20 parts of furfural, are heated together in an oil bath at 130° C. for ½ hour with stirring. The mixture is then allowed to cool to 80° C. and .5 part of concentrated hydrochloric acid is added and the mixture is heated in an oil bath to 130° C. in the course of 1 hour. The product when cooled to 25° C. is a black resinous condensation product.

Having fully described my invention, what I claim and desire to have protected by Letters Patent is:

1. A process of preparing new and useful resinous condensation products, consisting in heating furfural and lignin in the presence of the catalyst.

2. A process of preparing new and useful resinous condensation products, consisting in heating furfural and lignin in the presence of hydrochloric acid.

3. A process of preparing new and useful resinous condensation products, consisting in heating furfural and lignin in the presence of hydrochloric acid at a temperature of more than 100° C.

4. As new articles of manufacture, condensation products from furfural and lignin.

MAX PHILLIPS.